(12) United States Patent
Heigold et al.

(10) Patent No.: US 8,775,177 B1
(45) Date of Patent: Jul. 8, 2014

(54) SPEECH RECOGNITION PROCESS

(71) Applicant: Google Inc., Mountain View, CA (US)

(72) Inventors: Georg Heigold, Mountain View, CA (US); Patrick An Phu Nguyen, Palo Alto, CA (US); Mitchel Weintraub, Cupertino, CA (US); Vincent O. Vanhoucke, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/665,245

(22) Filed: Oct. 31, 2012

Related U.S. Application Data

(60) Provisional application No. 61/608,218, filed on Mar. 8, 2012.

(51) Int. Cl.
*G10L 15/06* (2013.01)

(52) U.S. Cl.
USPC ........ 704/243; 704/270.1; 704/256; 704/244; 704/253; 379/88.22; 379/88.26

(58) Field of Classification Search
CPC ... G10L 15/063; G10L 15/187; G10L 15/144; G10L 15/142; G10L 15/07; G10L 17/005
USPC ......... 704/251, 253, 256, 254, 243, 244, 500, 704/239, 270.1; 379/88.03, 88.22, 88.13, 379/88.26, 37; 707/999.102; 709/203; 705/53, 57, 80, 6; 715/716
See application file for complete search history.

(56) References Cited

U.S. PATENT DOCUMENTS

| | | | |
|---|---|---|---|
| 4,571,697 A | 2/1986 | Watanabe | |
| 4,783,802 A | 11/1988 | Takebayashi et al. | |
| 4,860,358 A | 8/1989 | Rabiner | |
| 4,908,865 A | 3/1990 | Doddington et al. | |
| 5,131,043 A | 7/1992 | Fujii et al. | |
| 5,864,810 A * | 1/1999 | Digalakis et al. | 704/255 |
| 5,946,653 A | 8/1999 | Campbell et al. | |
| 5,953,699 A | 9/1999 | Takagi | |
| 5,983,177 A * | 11/1999 | Wu et al. | 704/244 |
| 6,104,989 A | 8/2000 | Kanevsky et al. | |
| 6,336,108 B1 * | 1/2002 | Thiesson et al. | 706/20 |
| 6,529,902 B1 | 3/2003 | Kanevsky et al. | |
| 6,542,866 B1 * | 4/2003 | Jiang et al. | 704/255 |

(Continued)

OTHER PUBLICATIONS

Zweig et al. "Speech Recognition with Segmental Conditional Random Fields: A Summary of the JHU CLSP 2010 Summer Workshop" 2011.*

(Continued)

*Primary Examiner* — Vijay B Chawan
(74) *Attorney, Agent, or Firm* — Fish & Richardson P.C.

(57) ABSTRACT

A speech recognition process may perform the following operations: performing a preliminary recognition process on first audio to identify candidates for the first audio; generating first templates corresponding to the first audio, where each first template includes a number of elements; selecting second templates corresponding to the candidates, where the second templates represent second audio, and where each second template includes elements that correspond to the elements in the first templates; comparing the first templates to the second templates, where comparing comprises includes similarity metrics between the first templates and corresponding second templates; applying weights to the similarity metrics to produce weighted similarity metrics, where the weights are associated with corresponding second templates; and using the weighted similarity metrics to determine whether the first audio corresponds to the second audio.

16 Claims, 6 Drawing Sheets

(56) References Cited

U.S. PATENT DOCUMENTS

| | | | |
|---|---|---|---|
| 6,983,246 B2 | 1/2006 | Kepuska et al. | |
| 7,272,558 B1 | 9/2007 | Soucy et al. | |
| 7,310,601 B2 | 12/2007 | Nishizaki et al. | |
| 7,761,296 B1* | 7/2010 | Bakis et al. | 704/247 |
| 7,983,902 B2 | 7/2011 | Wu et al. | |
| 8,001,066 B2 | 8/2011 | Colbath et al. | |
| 8,301,450 B2 | 10/2012 | Lee et al. | |
| 2003/0055640 A1* | 3/2003 | Burshtein et al. | 704/235 |
| 2005/0119885 A1* | 6/2005 | Axelrod et al. | 704/231 |
| 2005/0149326 A1 | 7/2005 | Hogengout et al. | |
| 2005/0203738 A1* | 9/2005 | Hwang | 704/243 |
| 2006/0129392 A1 | 6/2006 | Kim | |
| 2006/0149710 A1 | 7/2006 | Koningstein et al. | |
| 2006/0184360 A1* | 8/2006 | Murveit et al. | 704/231 |
| 2007/0037513 A1 | 2/2007 | Bellamy et al. | |
| 2007/0100618 A1 | 5/2007 | Lee et al. | |
| 2007/0106685 A1 | 5/2007 | Hough et al. | |
| 2007/0118372 A1 | 5/2007 | Wise et al. | |
| 2007/0265849 A1* | 11/2007 | Grost et al. | 704/257 |
| 2008/0195389 A1* | 8/2008 | Zhang et al. | 704/246 |
| 2008/0201143 A1 | 8/2008 | Olligschlaeger et al. | |
| 2009/0030697 A1 | 1/2009 | Cerra et al. | |
| 2009/0055185 A1 | 2/2009 | Nakade et al. | |
| 2009/0055381 A1 | 2/2009 | Wu et al. | |
| 2010/0070268 A1* | 3/2010 | Sung | 704/203 |
| 2010/0161313 A1 | 6/2010 | Karttunen | |
| 2010/0305947 A1* | 12/2010 | Schwarz et al. | 704/252 |
| 2011/0004462 A1 | 1/2011 | Houghton et al. | |
| 2011/0035210 A1* | 2/2011 | Rosenfeld et al. | 704/9 |
| 2011/0077943 A1 | 3/2011 | Miki et al. | |
| 2011/0131046 A1* | 6/2011 | Zweig et al. | 704/251 |
| 2011/0296374 A1 | 12/2011 | Wu et al. | |
| 2012/0022873 A1 | 1/2012 | Ballinger et al. | |
| 2012/0029910 A1 | 2/2012 | Medlock et al. | |
| 2012/0072215 A1* | 3/2012 | Yu et al. | 704/240 |
| 2012/0150532 A1 | 6/2012 | Mirowski et al. | |

OTHER PUBLICATIONS

Wachter et al. "Outlier Correction for Local Distance Measures in Example Based Speech Recognition" 2007.*
Morris et al. "Conditional Random Fields for Integrating Local Discriminative Classifiers" 2008.*
Demuynck et al. "Progress in Example Based Automatic Speech Recognition" 2011.*
Seppi et al. "Template-based Automatic Speech Recognition meets Prosody" 2011.*
Wachter et al. "Template Based Continuous Speech Recognition" 2007.*
Aradilla et al. "Using Posterior-Based Features in Template Matching for Speech Recognition" 2006.*
Kanevsky et al. "An Analysis of Sparseness and Regularization in Exemplar-Based Methods for Speech Classification" 2010.*
Demange et al. "HEAR: An Hybrid Episodic-Abstract speech Recognizer" 2009.*
Gaudard et al. "Speech Recognition based on Template Matching and Phone Posterior Probabilities" 2007.*
Hoffmeister et al. "Cross-Site and Intra-Site ASR System Combination: Comparisons on Lattice and 1-Best Methods" 2007.*
Heigold et al. "A Flat Direct Model for Speech Recognition" 2009.*
Zweig et al. "SCARF: A Segmental Conditional Random Field Toolkit for Speech Recognition" 2010.*
Gemmeke et al. "Exemplar-based sparse representations for noise robust automatic speech recognition" 2010.*
Zweig et al. "Speech Recognition with Segmental Conditional Random Fields: Final Report from the 2010 JHU Summer Workshop" 2010.*
Demuynck et al. "Integrating Meta-Information Into Exemplar-Based Speech Recognition With Segmental Conditional Random Fields" 2011.*
Seppi et al. "Data Pruning for Template-based Automatic Speech Recognition" 2010.*
Nguyen et al. "Speech Recognition with Flat Direct Models" 2010.*
Heigold et al., "Investigations on Exemplar-Based Features for Speech Recognition Towards Thousands of Hours of Unsupervised, Noisy Data," Proceedings of the IEEE International Conference on Acoustics, Speech, and Signal Processing (ICASSP), IEEE, 2012, 4437-4440.
Sainath et al., "Exemplar-based sparse representation phone identification features," in Proc. ICASSP, 2011, 4492-4495.
Nederhof, "A General Technique to Train Language Models on Language Models," Association for Computational Linguistics, 31(2):173-185, 2005.
'CMUSphinx' [online]. "Open Source Toolkit for Speech Recognition," Carnegie Mellon University, Aug. 2, 2011 [retrieved on Dec. 16, 2011]. Retrieved from the internet: URL <http://cmusphinx.sourceforge.net/wiki/tutoriallm>, 3 pages.
Lane et al. "Dialogue speech recognition by combining hierarchical topic classification and language model switching." IEICE transactions on information and systems, 88(3):446-454, Mar. 2005.
Gildea et al. "Topic-based language models using EM." In Proceedings of Eurospeech, 1999, 1-4.

* cited by examiner

SPEECH RECOGNITION PROCESS

CROSS-REFERENCE TO RELATED APPLICATION

Priority is hereby claimed to U.S. Provisional Application No. 61/608,218, which was filed on Mar. 8, 2012. The contents of U.S. Provisional Application No. 61/608,218 are hereby incorporated by reference into this disclosure.

TECHNICAL FIELD

This disclosure relates generally to speech recognition.

BACKGROUND

Speech recognition includes processes for converting spoken words to text or other data. In general, speech recognition systems translate verbal utterances into a series of computer-readable sounds and compare those sounds to known words. For example, a microphone may accept an analog signal, which is converted into a digital form that is then divided into smaller segments. The digital segments can be compared to elements of a spoken language. Based on this comparison, and an analysis of the context in which those sounds were uttered, the system is able to recognize the speech.

A typical speech recognition system may include an acoustic model, a language model, and a dictionary. Briefly, an acoustic model includes digital representations of individual sounds that are combinable to produce a collection of words, phrases, etc. A language model assigns a probability that a sequence of words will occur together in a particular sentence or phrase. A dictionary transforms sound sequences into words that can be understood by the language model.

SUMMARY

Described herein is a speech recognition process that may perform the following operations: performing a preliminary recognition process on first audio to identify candidates for the first audio; generating first templates corresponding to the first audio, where each first template includes a number of elements; selecting second templates corresponding to the candidates, where the second templates represent second audio, and where each second template includes elements that correspond to the elements in the first templates; comparing the first templates to the second templates, where comparing includes determining similarity metrics between the first templates and corresponding second templates; applying weights to the similarity metrics to produce weighted similarity metrics, where the weights are associated with corresponding second templates; and using the weighted similarity metrics to determine whether the first audio corresponds to the second audio. The speech recognition systems may include one or more of the following features, either alone or in combination.

Selecting the second templates may include selecting templates associated with a non-zero weight.

Metadata may be associated with at least one of the first audio and the second audio. The metadata may be used in obtaining at least the second templates. The metadata may be indicative of the context of at least one of the first audio and the second audio. The metadata may indicate at least one word that neighbors a word in at least one of the first audio and the second audio.

The preliminary recognition process may include a Hidden Markov Model (HMM) based process. The preliminary recognition process may generate first scores associated with the candidates. Using the weighted similarity metrics to determine whether the first audio corresponds to the second audio may include generating second scores for the first audio, where the second scores correspond to whether the first audio corresponds to the second audio.

The operations may include combining the first scores and the second scores using a conditional random field technique to generate a composite score indicative of an extent to which the first audio corresponds to the second audio.

Each element may be at least one of: a phoneme in context, a syllable, or a word. The first templates may include vectors, the second templates may include vectors, and the similarity metrics may include distances between vectors. The second templates may include multiple groups of second templates, and each group of second templates may represent a different version of a same candidate word or phrase for at least one of the first and second audio.

The second templates may be selected from among a group of templates having associated weights. At least some of the weights may be negative. Weights may be determined using a conditional random field technique. At least some of the weights may be zero. Zero weights may be determined using a regularization technique.

Metadata may be associated with at least one of the first audio and the second audio. The metadata may indicate at least one of: information about a speaker of at least one of the first audio or the second audio, and information about an acoustic condition of at least one of the first audio or the second audio.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

Described herein are processes for performing speech recognition. The processes include performing a preliminary (first pass) recognition process on audio and then performing an exemplar- (e.g., template- or vector-) based recognition process on the audio. Scores from the two processes are used to identify a recognition candidate for the input audio.

Figure 1:
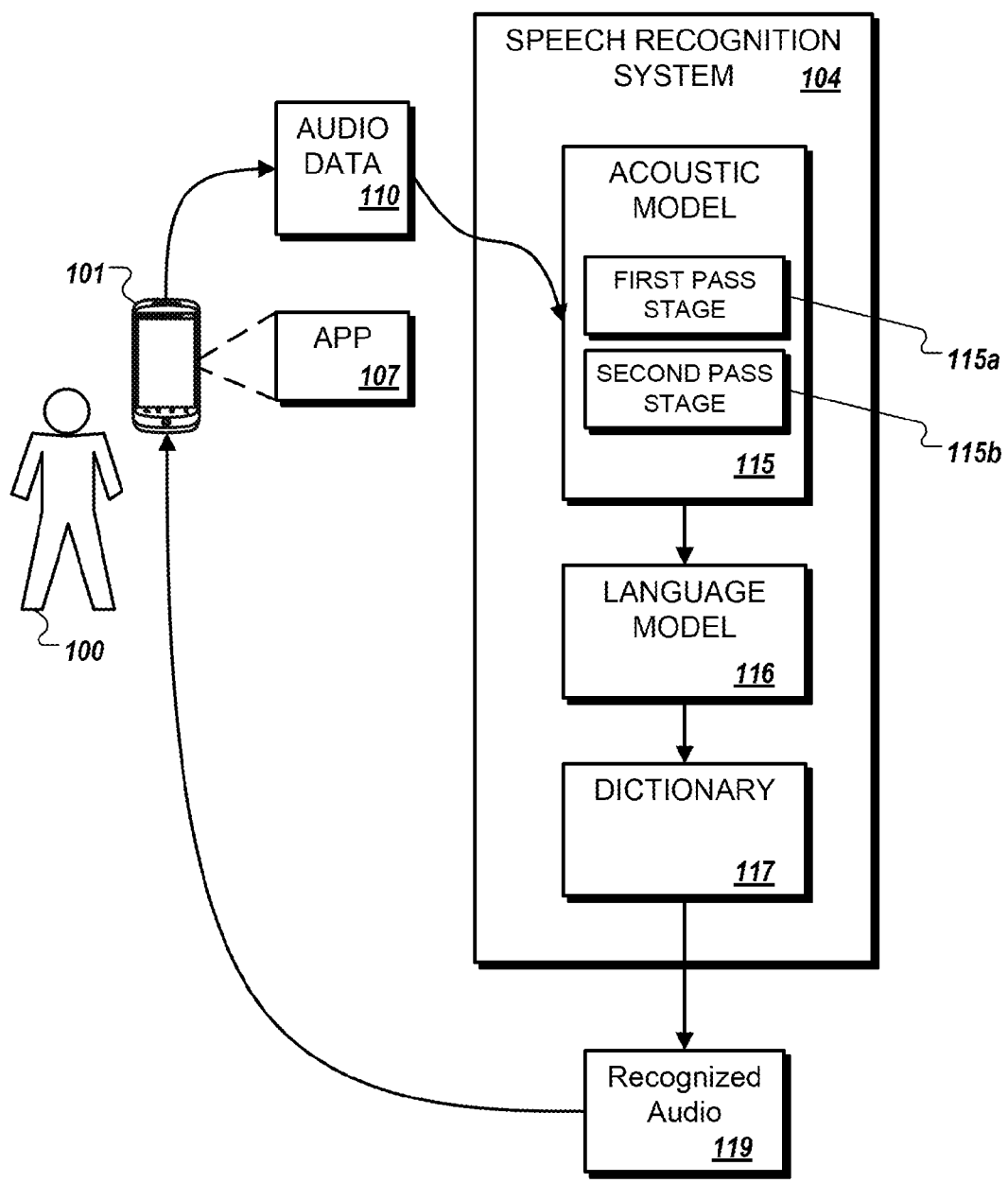
FIG. 1 shows, conceptually, an example of a speech recognition system.

FIG. 1 shows a conceptual example of a system for performing speech recognition according to the processes described herein. In the example of FIG. 1, a user 100 of a mobile device 101 accesses a speech recognition system 104. In this example, the mobile device 101 is a cellular telephone having advanced computing capabilities, known as a smartphone. Speech recognition system 104 may be hosted by one or more server(s) that is/are remote from mobile device 101. For example, speech recognition system 104 may be part of another service available to users of the mobile device 101 (e.g., a help service, a search service, etc.).

In this example, mobile device 101 may include an application 107 ("app") that receives input audio (e.g., speech) provided by user 100 and that transmits data 110 representing that input audio to the speech recognition system 104. App 107 may have any appropriate functionality, e.g., it may be a search app, a messaging app, an e-mail app, and so forth. In this regard, an app is used as an example in this case. However, all or part of the functionality of the app 107 may be part of another program downloaded to mobile device 101, part of another program provisioned on mobile device 101, part of the operating system of the mobile device 101, or part of a service available to mobile device 101.

In an example, app 107 may ask user 100 to identify, beforehand, the languages that user 100 speaks. The user 100 may select, e.g., via a touch-screen menu item or voice input, the languages that user 100 expects to speak or have recognized. In some implementations, user 100 may also select among various accents or dialects. Alternatively, the user's languages, accents, and/or dialects may be determined based on the audio input itself or based on prior audio or other appropriate input.

To begin the speech recognition process, user 100 speaks in a language (e.g., English) into mobile device 101. App 107 generates audio data 110 that corresponds to the input speech, and forwards that audio data to speech recognition system 104. Speech recognition system 104 includes one or more of each of the following: an acoustic model 115, a language model 116, and a dictionary 117. In this example implementation, acoustic model 115 includes digital representations of individual sounds that are combinable to produce a collection of words, phrases, etc. Language model 116 assigns a probability that a sequence of words will occur together in a particular sentence or phrase. Dictionary 117 dictionary transforms sound sequences into words that can be understood by language model 116.

In an example implementation, acoustic model 115 includes two stages: a "first pass" stage 115a and a "second pass" stage 115b. In this example, first pass stage 115a is implemented using a Hidden Markov Model (HMM)-based system, which identifies recognition candidates and assigns scores thereto. Second pass stage 115b uses templates, such as vectors, to represent input audio. These vectors are compared to other vectors that represent known words, phrases or other sound sequences. Distances between vectors for input audio and for known audio correspond to a likelihood that the input audio matches the known audio. The distances, which correspond to scores, are used in adjusting the score(s) from the first pass stage to identify a best recognition candidate for the input audio. In an example, a conditional random field process may be used to combine the scores from the first pass stage and the second pass stage to identify the candidate. The first pass stage is described initially, followed by the second pass stage.

In an example, in the first pass stage, the HMM-based system uses one or more state machines to identify first pass recognition candidates. In general, a state machine may be used to recognize an unknown input. In this example, the state machine determines a sequence of known states representing sounds that that best match input speech. This best-matched sequence is deemed to be the state machine's hypothesis for the input speech. The audio element recognized in the first pass stage may be a part of a word (e.g., a syllable), phoneme, etc; a whole word, phoneme, etc.; a part of a sequence of words, phonemes, etc., and so forth.

During the speech recognition process, each state in the state machine receives the best incoming path to that state (e.g., the incoming path with the lowest cost), determines how good a match incoming audio is to itself, produces a result called the "state matching cost", and outputs data corresponding to this result to successor state(s). The combination of state matching costs with the lowest cost incoming path is referred to as the "path cost". The path with the lowest path cost may be selected as the best-matched sequence for the input speech.

Accordingly, in the context of the processes described herein, a "path" includes a sequence of states through a state machine that are compared to input audio data. A "path cost" includes a sum of matching costs (e.g., costs of matching a state to a segment of audio) and transition costs (costs to transition from a state_i to a state_j). A "best path cost" includes the "path" with the lowest "path cost". A state in a state machine may have several different states that can transition to the current state. To determine the "best input path" leading into a state, the "path cost" for each path arriving at a current state should be known. If any of the incoming "path costs" are unknown at the current time, then the "best path cost" for this state cannot be determined until incoming path costs become known.

Figure 2:
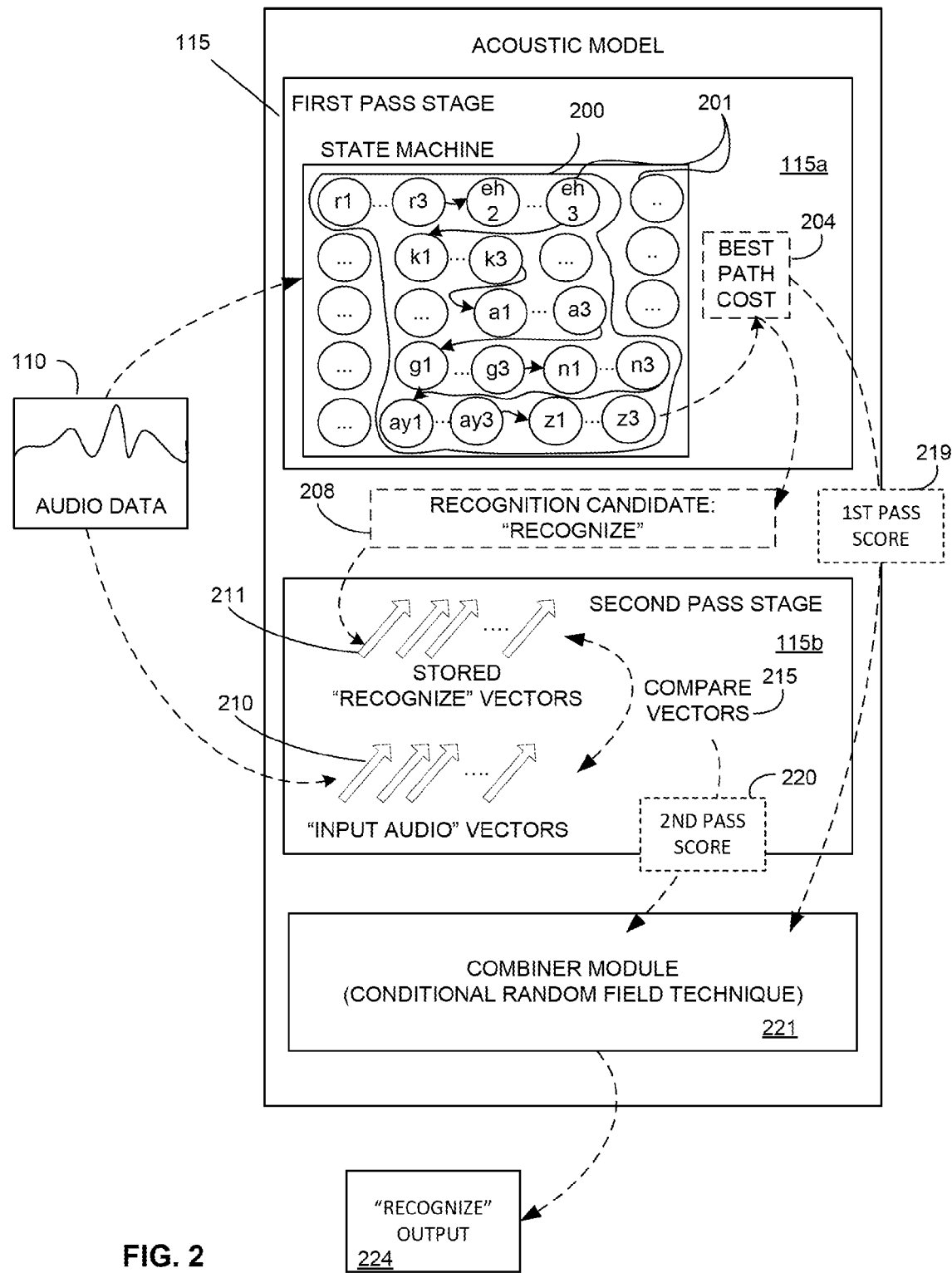
FIG. 2 shows an example of an acoustic model of the speech recognition system.

Referring to FIG. 2, user 101 utters input speech, e.g., the word "recognize", into mobile device 101. Mobile device 101 converts the input speech into audio data 110. In this example, the audio data is part of a continuous stream that is sent from a microphone to speech recognition system 104. The speech is received at acoustic model 115 at both the first and second pass stages.

The part of the speech recognition process performed by acoustic model 115 employs state machine 200 that include states 201. In this example, these states may represent sub-phonemes in the English language. In an example implementation, a phoneme is the smallest piece of sound that provides meaningful distinctions between different words in one or more languages (e.g., every word has a sequence of phonemes). In the example of FIG. 2, the acoustic data of phonemes are further broken down into smaller components called sub-phonemes, which can facilitate more accurate speech recognition (since smaller units of sound are recognized). At the end of the recognition process, state machine 200 determines best path cost 204, which corresponds to a sequence of sub-phonemes that best matches the corresponding input audio element. The better the match is between an audio element and a sequence of sub-phonemes, the smaller the resulting path cost is. Therefore, in this example, the best path cost corresponds to the sequence of sub-phonemes which has the smallest path cost.

In the example of FIG. 2, the speech recognition system includes a state machine 200 with M states, where M≥1. Audio element, "recognize", can be broken-down into the following set of sub-phonemes: r-r-r-eh-eh-eh-k-k-k-ao-ao-ao-g-g-g-n-n-n-ay-ay-ay-z-z-z, which are labeled as follows: r1, r2, r3, eh1, eh2, eh3, k1, k2, k3, ao1, ao2, ao3, g1, g2, g3, n1, n2, n3, ay1, ay2, ay3, z1, z2, z3. State machine 200, therefore, should ultimately find the best path to be the following sequence of sub-phoneme states: r1, r2, r3, eh1, eh2, eh3, k1, k2, k3, ao1, ao2, ao3, g1, g2, g3, n1, n2, n3, ay1, ay2, ay3, z1, z2, z3.

In this example, first pass stage 115a of the acoustic model compares the input audio to its model for the word "recognize" and finds a candidate 208 with a best path cost. The candidate corresponds to the sequence of sub-phonemes that has the lowest path cost. More than one best path cost may be obtained in some cases. For example, if determined best path costs are close (e.g., within a predefined tolerance of each other or another metric), several candidates may be selected. One or more words, phrases, etc. 208 thus may be identified and sent to second pass stage 115b for further processing.

In second pass stage 115b, the input audio is broken-down into time duration segments. The segments may be, for example, 10 ms each or any other appropriate duration. An average word is around 500 ms. So, in the 10 ms example, an average word contains about 50 segments. Other words, however, may have fewer or lesser numbers of segments. The segments are represented by templates. In this example, the templates include vectors 210 having a number of features (e.g., one feature per dimension of a vector). In an example implementation, there are 39 features per vector; however, other implementations may use different numbers of features. So, in the second pass stage, the acoustic model is not a series of states as in the first pass stage, but rather a number of vectors for a sound sequence (e.g., a word or phrase). Although the implementations described herein use vectors, other types of templates may be used instead of vectors.

In an example implementation, vectors for input audio are generated by performing a Fast Fourier Transform (FFT) on the input audio to obtain its frequency components. A cosine transformation is performed on the frequency components to obtain features for the vectors. In this example, thirteen features are obtained per 10 ms segment. First and second derivatives of those features are taken over time to obtain an additional 26 features to produce the full 39 features for a vector. In some implementations, perceptual linear prediction (PLP) features or Mel frequency cepstrum coefficients (MFCC) may be used in the vectors.

In second pass stage 115b, stored vectors 211 are identified that correspond to recognition candidate(s) identified in first pass stage 115a. In this regard, during a training phase, the speech recognition system generates, identifies, and stores in a database, vectors for different speech elements. In this example, the speech element is a word; however, vectors may be pre-stored in a database for syllables phrases, word combinations, or other sounds sequences as well, and used as described herein to recognize more or less than a single word.

In the training phase, audio is recognized and vectors are generated for the corresponding audio as described above. The audio may be recognized using automatic and/or manual recognition processes. In other words, the training data may be unsupervised or supervised. For example, input audio may be for the word "recognize". During training, the input audio is recognized, e.g., using a standard HMM-based approach with, or without, manual (e.g., human) confirmation. Vectors for that input audio may be generated and stored in memory. For example, if the audio is the word "recognize", and that word is 1000 ms in duration, then there are 100 vectors stored, one for each 10 ms of audio on the word "recognize".

The foregoing process may be performed, during the training phase, for various instances of the word "recognize". For example, different groups of vectors may be generated for the word "recognize" spoken using different speech patterns, for different durations, in different accents, in different (e.g., noise or quiet) environments, in different word contexts, and so forth. The result may be numerous groups of vectors, all of which represent different versions of the same words e.g., "recognize". The vectors may differ in content for reasons noted above, and may be used in the second pass stage to generate a recognition candidate for the input audio in the manner described herein.

The training phase may associate metadata with each vector identifying, e.g., the word that the vector represents. For example, each vector may also be assigned a weight, which may be represented by metadata. The weights may be indicative or the likelihood (e.g., a confidence or relevance score) that the vector representation is accurate. For example, higher weights (indicative of more accuracy) may be assigned to manually-verified vector representations than for vector representations that are not manually verified. Likewise, vector representations for noisy audio, or other audio that is deemed generally unreliable for some reason, may be assigned lower weights (indicative of less accuracy), since such noise may affect recognition accuracy. In some implementations, vector representations for audio that exceeds a predefined noise threshold may be assigned weights of zero. A regularization process may be used to obtain the weights of zero. In this regard, the weight assigned to the vector may be proportionate to the noise level of the associated audio, or to its reliability in general. In some implementations, the weights may be negative, which indicates a negative correlation between a vector representation and audio. In some implementations, the weights may be determined using a conditional random field technique.

The metadata may also identify other features associated with the input audio. For example, the metadata may identify one or more words that neighbor the word that is the subject of a vector. In this context, "neighbor" may include, but is not limited to, one or more words either before or after the word at issue. In some examples, the one or more words are directly before or after the word at issue; however, this need not be the case always.

The metadata may also identify other contextual aspects of the audio. For example, the metadata may specify a source of the audio, e.g., a television network, an online video service, a video device (e.g., a digital video camera), and so forth. The metadata may also include, if available, information about the linguistic characteristics of the audio, e.g., the speaker's accent, location, and so forth. The metadata may also identify the condition of the audio, e.g., whether the audio is noisy, the amount of noise, the type of noise, and so forth.

Vectors stored in the training phase are used in second pass stage 115b in recognizing input audio. More specifically, vectors are identified, in storage, for a first pass stage recognition candidate. Vector for the input audio (the "input audio vectors") are compared 215 to the stored vectors, and are scored against the stored vectors. In this example, the scores are based, at least in part, on a calculated distance between the input audio vectors and each stored vector. In some implementations, the calculated distance between two vectors is the Dynamic Time Warping (DTW) distance. In an example, the DTW distance is the summed Euclidean distances of the best warping of two vectors. The warping usually is subject to certain constraints, for example, monotonicity and bounded jump size. The DTW distance can be determined using dynamic programming techniques, with a complexity quadratic in a number of frames. The DTW distance may be length-normalized, if necessary, to make vectors of different length comparable.

Generally, the DTW distance is indicative of how closely the input audio corresponds to the word represented by stored vectors. In the above example, the DTW distances between the input audio vectors 210 and stored vectors 211 for "recognize" are indicative of how closely input audio corresponds to the word "recognize". This DTW distances may be determined for any number (e.g., all or a subset) of stored vectors for the same word. The DTW distances for various vector comparisons may be considered together or combined mathematically to provide an indication of a likelihood that the input audio is a known word.

In some implementations, scores 219 resulting from the first pass stage and score 220 resulting from the second pass stage (e.g., the DTW distances or scores based thereon) are both used to produce an overall score indicative of how well the input audio matches a word. In some implementations, a combiner module 211, which implements a conditional random field technique, may be used to generate a final recognition score and thus an output recognition candidate 224.

Factors other than the DTW distances and first pass stage scores may also affect the final recognition score. For example, weights applied to the stored vectors may affect the amount that those stored vectors contribute to the final recognition score. For example, the output of the second pass stage may be adjusted (e.g., multiplied by) weights for corresponding pre-stored vectors. Vectors that are deemed reliable representations of audio (e.g., manually-confirmed vectors or vectors generated from audio having low levels of noise) may have a greater effect on the final recognition score than other, less-reliable vectors. Accordingly, such vectors may be associated with higher weights than other vectors.

In some implementations, vector weights are identified prior to vector identification. Only those vectors having (e.g., positive) non-zero weights, or weights that exceed a predefined threshold, may be identified and compared against a vector for input audio. As a result, the amount of vector comparisons that are performed can be reduced. In other implementations, the zero-weighted vectors may be identified; however, their zero weight effectively discounts their effect on the final score.

In some implementations, neighboring words may be used to adjust scores resulting from DTW distances. For example, the input audio may include the word "to", neighbored by "going", as in "going to". In recognizing "to" in the first pass stage, metadata may be associated with the resulting recognition candidate indicating that the word "going" precedes the word "to". This information may be used to adjust the weight applied to the DTW distance. For example, in some cases, if it is known what a predecessor word was, the weight may be adjusted so that the resulting score is downgraded or upgraded. For example, "thereto" is a word that ends in "to". If the first pass stage indicates that "there" precedes "to" in audio, a recognition result for the word "to" may be downgraded (e.g., by adjusting the weight for its corresponding vectors downward) to reflect the possibility that the word "to" is part of "thereto", rather than the stand-alone word "to". In other implementations, more than one neighboring word or sound sequence may affect the determination. In a similar manner, succeeding neighbor words may affect applied weights.

In some implementations, neighboring words may affect which vectors are identified for comparison with the input audio. For example, if neighboring words are known, vectors reflecting a combination of those neighboring words with the word at issue may be identified and compared to the input audio. This may reduce the number of comparisons that occur, particularly where there are large numbers of vector examples for words (e.g., for prepositions, such as "to").

Metadata, such as that described above for the vectors produced in the training phase, may be associated with vectors generated from the input audio, in cases where the appropriate information is available. The metadata for the input audio vectors may be used in scoring stored vectors. For example, the metadata of input audio vectors may be matched to corresponding metadata of stored vectors and, where matches are/are not present, recognition scores may be adjusted.

Referring back to FIG. 1, the final recognition output constitutes recognized audio. The recognized audio 119 may include, e.g., a textual transcription of the audio, language information associated with included recognition candidates, or other information representative of its content.

The recognized audio 119 may be provided as data to the mobile device 101 that provided the input audio. For example, a user may input audio to the speech recognition system through the mobile device 101. The recognized audio 119 may be provided to the mobile device 101 or another service and used to control one or more functions associated with the mobile device 101. For example, an application on the mobile device 101 may execute an e-mail or messaging application in response to command(s) in the recognized audio 119. Likewise the recognized audio 119 may be used to populate an e-mail or other message. Processes may be implemented, either remote from, or local to, mobile device 101, to identify commands in an application, such as "send e-mail" to cause actions to occur, such as executing an e-mail application, on mobile device 101.

In another example, recognized audio 119 may be provided as data to a search engine. For instance, recognized audio 119 may constitute a search query that is to be input to a search engine. The search engine may identify content (e.g., Web pages, images, documents, and the like) that are relevant to the search query, and return that information to the computing device that provided the initial audio. In some implementations, the recognized audio may be provided to the computing device prior to searching in order to confirm its accuracy.

In another example, recognized audio 119 may be used to determine advertisements related to the topic of the audio. Such advertisements may be provided in conjunction with output of the audio content.

Figure 3:
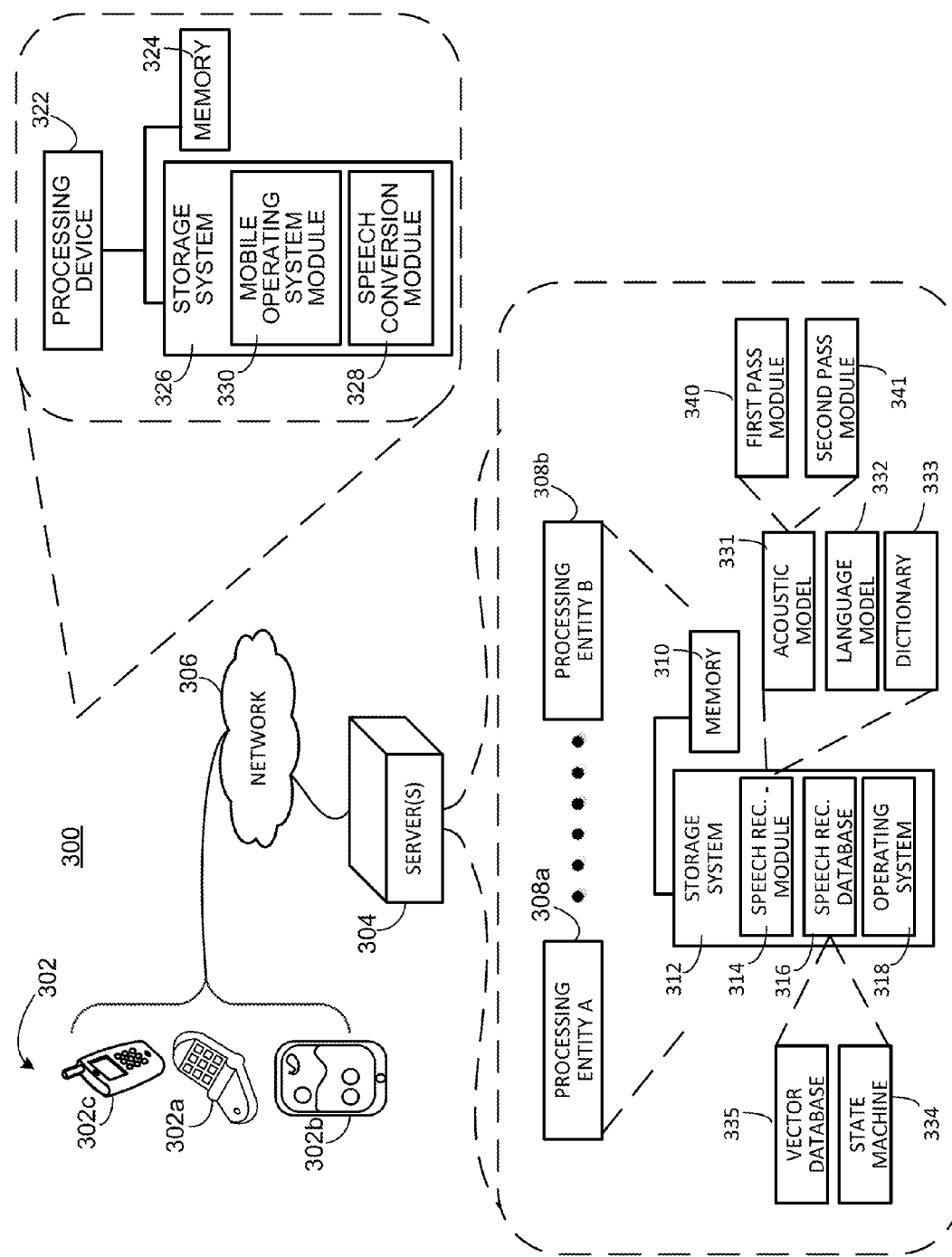
FIG. 3 is an example of a network on which the speech recognition system may be implemented.

FIG. 3 is a block diagram of an example of a system 300 on which the processes of FIGS. 1 and 2 may be implemented. For example, input speech may be provided through one or more of communication devices 302. Mobile device 101 of FIG. 1 is an example of a communication device 302 that may be used to perform the processes described herein. Resulting audio data may be transmitted to one or more processing entities (e.g., processing entities 308a and 308b or more), which may be part of server(s) 304, for speech recognition performed as described herein.

Communication devices 302 may communicate with server(s) 304 through network 306. Network 306 can represent a mobile communications network that can allow devices (e.g., communication devices 302) to communicate wirelessly through a communication interface (not shown), which may include digital signal processing circuitry where appropriate. Network 306 can include one or more networks. The network(s) may provide for communications under various modes or protocols, e.g., Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver. In addition, short-range communication may occur, e.g., using a Bluetooth, WiFi, Near Field Communication, or other such transceiver.

Communication devices 302 can include various forms of client devices and personal computing devices. Communication devices 302 can include, but are not limited to, a cellular telephone 302a, personal digital assistant (PDA) 302b, and a smartphone 302c. In other implementations, communication devices 302 may include (not shown), personal computing devices, e.g., a laptop computer, a handheld computer, a desktop computer, a tablet computer, a network appliance, a camera, an enhanced general packet radio service (EGPRS) mobile phone, a media player, a navigation device, an email device, a game console, or a combination of any two or more of these data processing devices or other data processing devices. In some implementations, the personal computing device can be included as part of a motor vehicle (e.g., an automobile, an emergency vehicle (e.g., fire truck, ambulance), a bus).

Communication devices 302 may each include one or more processing devices 322, memory 324, and a storage system 326. Storage system 326 can include a speech conversion module 328 and a mobile operating system module 330. Each processing device 322 can run an operating system included in mobile operating system module 330 to execute software included in speech conversion module 328. Referring to FIGS. 1 to 3, speech conversion module 328 may receive input speech 106 and perform any processing necessary to convert the input speech into audio data 110 for recognition.

Server(s) 304 can include various forms of servers including, but not limited to, a web server, an application server, a proxy server, a network server, a gateway, or a server farm. Server(s) 304 can include one or more processing entities 308a, 308b. Although only two processing entities are shown, any number may be included in system 300. In this example, each entity includes a memory 310 and a storage system 312. Processing entities 308a, 308b can be real (e.g., different computers, processors, programmed logic, a combination thereof, etc.) or virtual machines, which can be software implementations of machines that execute programs like physical machines. Each storage system 312 can include a speech recognition module 314, a speech recognition database 316, and a server operating system module 318. Each processing entity 308a, 308b can run an operating system included in the server operating system module 318 to execute software included in the modules that make-up speech recognition module 314. In this regard, the operation of speech recognition module may be spread across various processing entities or performed in a single processing entity.

A speech recognition module 314 can process received audio data, or a portion thereof, from a communication device 302 (e.g., cellular telephone 302a) and use speech recognition database 316 to determine the spoken word content of the speech data. Each speech recognition module may include an acoustic model 331, a language model 332, and a dictionary 333. As noted, acoustic model 331 includes digital representations of individual sounds that are combinable to produce a collection of words, phrases, etc. Language model 332 assigns a probability that a sequence of words will occur together in a particular sentence or phrase. Dictionary 333 transforms sound sequences into words that can be understood by the language model. Speech recognition database 316 includes data for one or more state machines 334 for performing the first stage recognition process described herein and a vector database 335 that includes vectors for known words for performing the second stage recognition process described herein.

In this implementation, acoustic model 331 includes a first pass module 340 and a second pass module 341, which implement the first pass and second pass recognition stages described herein. First pass module 340 may be a discriminatively trained HMM model (e.g., of the type shown in FIG. 2) that uses Gaussian mixtures and PLPs as front-end features. The decoding performed by first pass module 340 may use a trigram language model. Second pass module 341 may be an exemplar features-based recognition process, which uses vectors representing segments of audio to identify the content of input audio. A combiner module (not shown in FIG. 3), which also may be part of the acoustic model, combines scores produced by the first pass module and the second pass module to identify one or more higher-rated recognition candidates for input audio.

Figure 4:
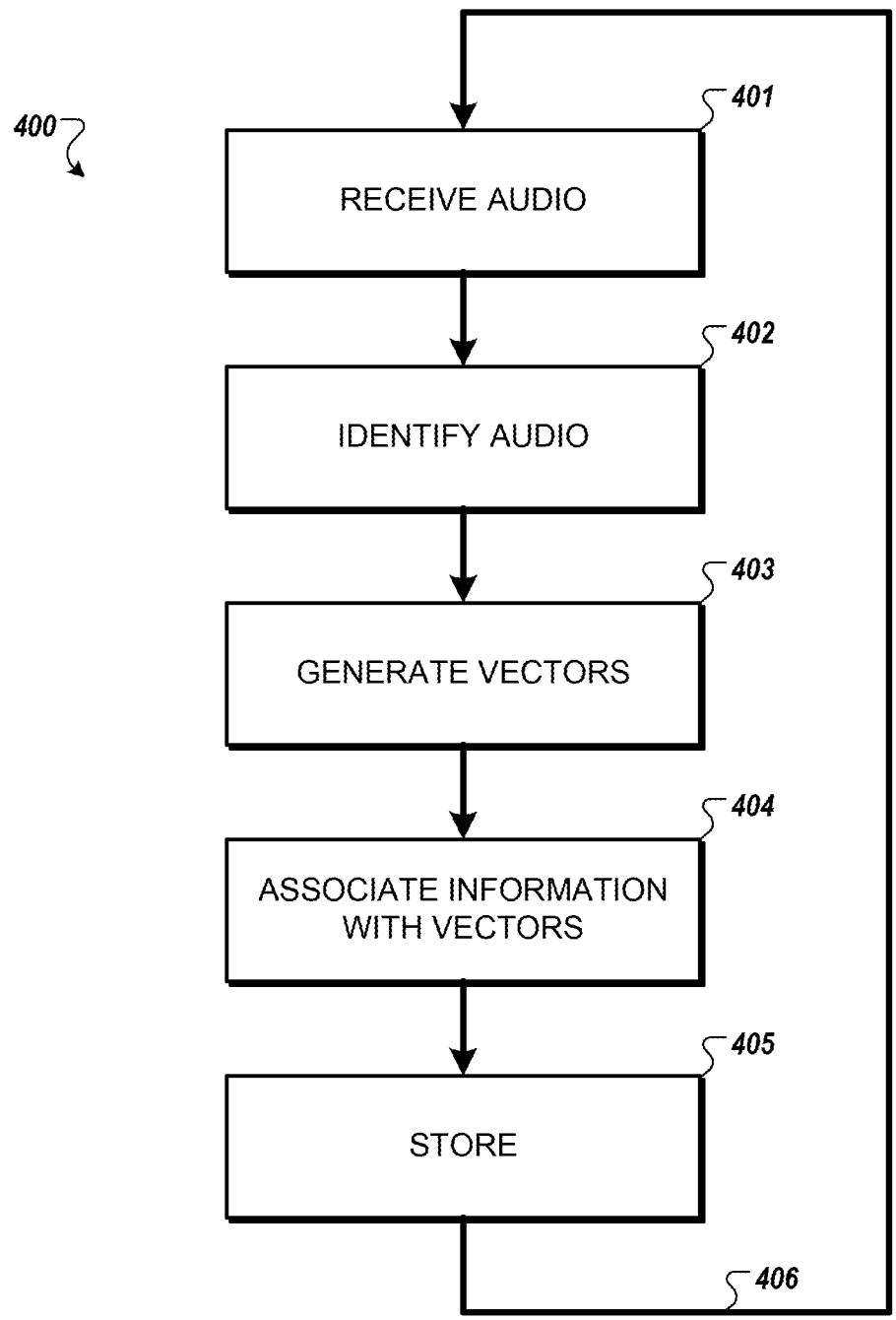
FIG. 4 is a flowchart showing an example training phase for use in the speech recognition system.

Further details about the speech recognition processes performed the first and second pass modules will be described with respect to FIGS. 4 and 5. FIG. 4 shows operations performed during a training phase process 400. Process 400 may be performed by speech recognition module 314 of FIG. 3, either alone or in combination with one or more other appropriate computer programs.

In example implementations, the training phase includes, among other things, generating a database of vectors for segments of audio; identifying words, phrases or sounds sequences that are represented by groups of the vectors; and associating weights and metadata with the vectors.

More specifically, the speech recognition system is trained on a corpus of audio. The corpus need not be a single source of audio, but rather may contain multiple sources including, e.g., broadcast audio, audio from online sources, speech, music, other sounds, noise and so forth. Training includes receiving (401) segments of the audio from the corpus. The segments of audio may be of any appropriate length. In this example, the segments are 10 ms. The received audio is identified (402). For example, the retrieved audio may be identified using an HMM-based system having one or more state machines. The identification process may be completely automatic, e.g., the HMM-based system may identify sounds in the audio; a language model may provide phonetic representations of words composed of those sounds; and a dictionary may transform sound sequences into words that can be understood by the language model. In some implementations, the training phase may include making a manual determination about the identity of input audio. For example, a person may identify the audio or confirm the accuracy of the result produced by an HMM-based system. In other implementations, a person may identify the audio without the assistance of the HMM-based system. In still other implementations, the automatic portion of the recognition may be a system other than an HMM-based system.

Vectors are generated (403) for the audio. In this implementation, vectors for input audio are generated by performing a Fast Fourier Transform (FFT) on the audio to obtain its frequency components. A cosine transformation is performed on the frequency components to obtain features for the vectors. In this example, thirteen features are obtained. First and second derivatives of those features are taken over time to obtain an additional 26 features to produce the full 39 features for a vector. In some implementations, perceptual linear prediction (PLP) features or Mel frequency cepstrum coefficients (MFCC) may be used in the vectors.

Information is associated (404) with the generated vectors. For example, the information may include weights and metadata, including, but not limited to, the weights and metadata described above. During the training phase, the applied weights and metadata, if appropriate, are used to generate outputs for known audio. Accordingly, a testing phase may be part of the training. If the applied weights do not generate the appropriate output during testing, then the applied weights may be adjusted until the appropriate output is obtained.

In an example implementation, the model weights may be estimated using a maximum mutual information (MMI) training criterion. As there may be millions of features to consider, most of which are not expected to be relevant, regularization may be used for feature selection. In addition, regularization may be used to avoid overfitting. Processing may be performed using the general-purpose L-BFGS or Rprop techniques.

The information associated (404) with the generated vectors may also identify a word or phrase associated with each vector. In this regard, given that vectors in this example represent 10 ms of audio, a single vector will not typically represent an entire word. However, a group of such vectors (e.g., 50) may represent a word and several groups may represent a phrase or other sound sequence. The metadata associated with each vector may identify the word or phrase that the vector is part of, and what part of the word or phrase the vector represents. For example, the metadata may specify that the word that a vector is part of is "recognize" and it may specify what part of the word "recognize" that the vector represents (e.g., the first 10 ms, the tenth 10 ms, and so forth).

In some implementations, a group of vectors is not representative of audio (e.g., a negative representation) and may be indicated as such in metadata.

Vectors and associated metadata are stored (405) in a database. The vectors may be indexed, e.g., by word or words, for retrieval. The training process continues 406 for all or part of the corpus of audio. The training may be updated, as desired, using new audio or the same audio.

Figure 5:
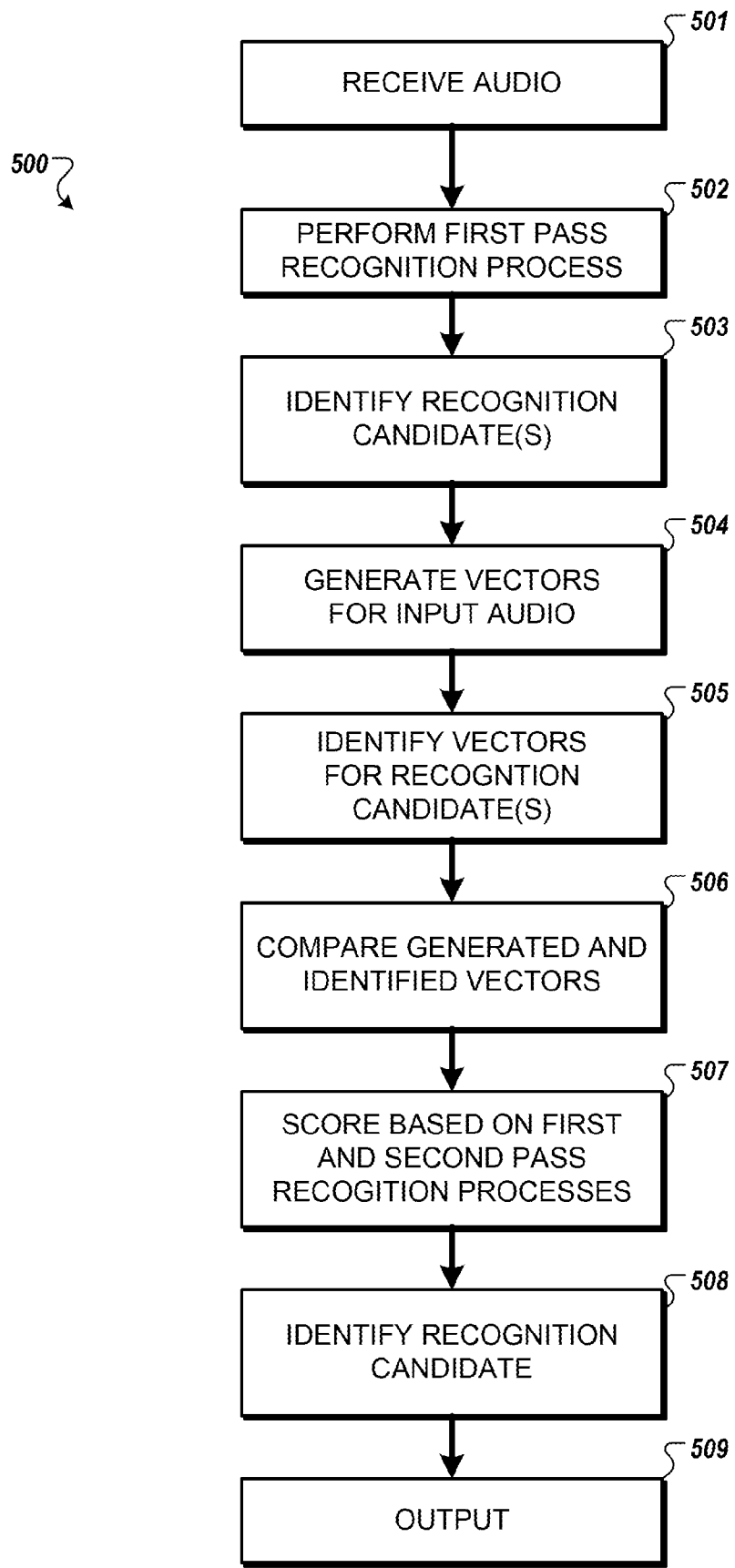
FIG. 5 is a flowchart showing an example process for recognizing speech.

FIG. 5 is a flow diagram for an example process 500 for performing speech recognition. Process 500 may be performed by speech recognition module 314 of FIG. 3, either alone or in combination with one or more other appropriate computer programs.

In process 300, audio is received (501). For example, speech recognition module 314 may receive audio from a computing device, such as mobile device 101 (FIG. 1). The input audio referred to herein may include all of the audio received between designated start and stop times, or a portion or snippet thereof. In the example described here, the audio is input speech; however, any type of audio may be received. For example, the audio may be a recorded musical track, a recorded track associated with video, and so forth. Phonemes ("phones") are identified in the input audio and may be used, as described below, to identify the content of the audio.

A recognition process is performed (502) on the input audio. For example the recognition process may be performed by first pass module 340. In this example, first pass module 340 is an HMM-based system (e.g., like first pass stage 115a of FIGS. 1 and 2), as described above, which produces scored recognition candidates. Candidates for recognition of the input audio are identified (503) by their scores. For example, one or more candidates with the highest recognition scores may be identified and selected. A predefined number of candidates may be selected, or those within a predefined tolerance of the candidate with the highest score may be selected. Selection criteria other than these may also be used. The candidates are provided to second pass module 341. There, at least some of the following operations may be performed to generate final recognition candidates (e.g., a best recognition candidate).

Vectors are generated (504) for the input audio. The vectors may be for 10 ms segments of the audio, as described above, and may include appropriate metadata. Vectors that may correspond to the input audio are identified (505) in the database. The vectors that are identified are vectors for the words, phrase, etc. of audio recognized in the first pass stage. For example, if the first pass stage has identified candidates of "recognize", "recognized", and "ignition", then vectors corresponding to those words are identified in the database based, e.g., on their associated metadata. For example, a search of an index may be performed to identify the vectors. In some implementations, all vectors corresponding to a recognition candidate are identified. In other implementations, a subset of all vectors corresponding to a recognition candidate is identified. For example, vectors with weights that are at, or below, a predefined value, e.g., zero, may be excluded from consideration. In this case, it is possible to reduce the effects of noise or other artifacts on the recognition process. Furthermore, as a result, the amount of processing performed is reduced (since vectors with zero weights need not be processed). Thus, the metadata may be used to reduce the amount of processing performed, since it can result in consideration of fewer numbers of vectors than would otherwise be considered.

In this regard, all stored vectors may not be accurately labeled. For example, vectors for "recognize" may be inaccurately labeled as being for "recognition". By using a number of vectors from the database for comparison, the effects of inaccurately-labeled vectors may be mitigated in some cases.

The vectors for the input audio are compared (506) to the identified vectors for the recognition candidates to determine similarity metrics between the vectors for the input audio and the identified vectors. The similarity metric may be based on DTW distances between vectors, as noted above. The similarity metrics may be such that they reduce the effects of noise and errors on recognition.

In an example implementation, the similarity metric is referred to as a "template feature". In an example implementation, template features (f) may be based on a segmented word W (e.g., broken into segments of 10 ms) and frame features X associated with this word segment. In an example implementation, a template feature is set to the average DTW distance between a recognition hypothesis X (e.g., the vector for recognition candidate from the first pass stage) and the k-nearest vectors of X associated with the hypothesis word W, where $Y \in KNN_W(X)$ (KNN, meaning "k-nearest neighbor vectors) if the word hypothesis $W^I$ matches the template word W. Otherwise, the template feature is set to zero. This is expressed in the following equation:

$$f_{W^I}^{tmpl}(X, W) = \begin{cases} \sum_{Y \in KNN_W(X)} \frac{d(X, Y)}{|KNN_W(X)|} & \text{if } W' = W \\ 0 & \text{otherwise} \end{cases}$$

Accordingly, in this example, there is one template feature for each word.

In another example implementation, individual DTW distances are used as the template features. The DTW distances may be exponentiated to achieve a more sparse representation and thus, in some cases, faster training. In addition, this non-linearity enables modeling of arbitrary decision boundaries. This is expressed in the following equation:

$$f_Y^{kernel}(X, W) = \begin{cases} \exp(-\beta d(X, Y)) & \text{if } Y \text{ template of } W \\ 0 & \text{otherwise} \end{cases}$$

$\beta$, in the above equation, is a scaling factor.

The similarity metric may be adjusted by weights associated with the corresponding vectors. In addition, the similarity metric may be adjusted in accordance with other metadata associated with the vectors (e.g., the identity(ies) of neighboring words, the context of the audio, and so forth).

Thus, the output of second pass module 341 includes one or more scores (e.g., one or more template features) that are indicative of how well the recognition candidate from first pass module matches vectors from database 335.

The scores produced by first pass module 340 are re-scored (507) using the scores produced by second pass module 341 to identify (508) which of the recognition candidates best matches the input audio. In an implementation, the combination of the template features from the second pass module with the first pass scores is performed using a segmental conditional random field.

A segmental conditional random field is a conditional random field defined on word lattices. In an implementation, the features of the conditional random field are defined on the word arc level. In addition to the template features, language and acoustic model scores are used as features. As a result, the re-scoring result is no worse than the first-pass baseline result.

The resulting output (509) of speech recognition module 314 may be applied to language model 332 that generates a phonetic representation of the selected (e.g., best) recognition candidate, along with other appropriate information identifying the word or phrase. Dictionary 333 may be used to transform sound sequences into words that can be understood by the language model.

Data corresponding to the selected recognition candidate is output as a recognized version of the audio. For example, speech recognition module may output the data to the appropriate device or process. In different examples, the output may be formatted as part of an XML file, a text transcription, a command or command sequence, a search query, and so forth. The data may be presented to the user, either audibly or visually, or it may be used as part of a process either on the user's device or elsewhere. For example, a transcription of the input audio may be applied to a translation service, which may be programmed to generate an audio and/or textual translation of the input audio into another, different language (e.g., from English to French) for output to the user's computing device. In some examples, the user may be able to specify the accent or dialect of the target language for the output audio.

Figure 6:
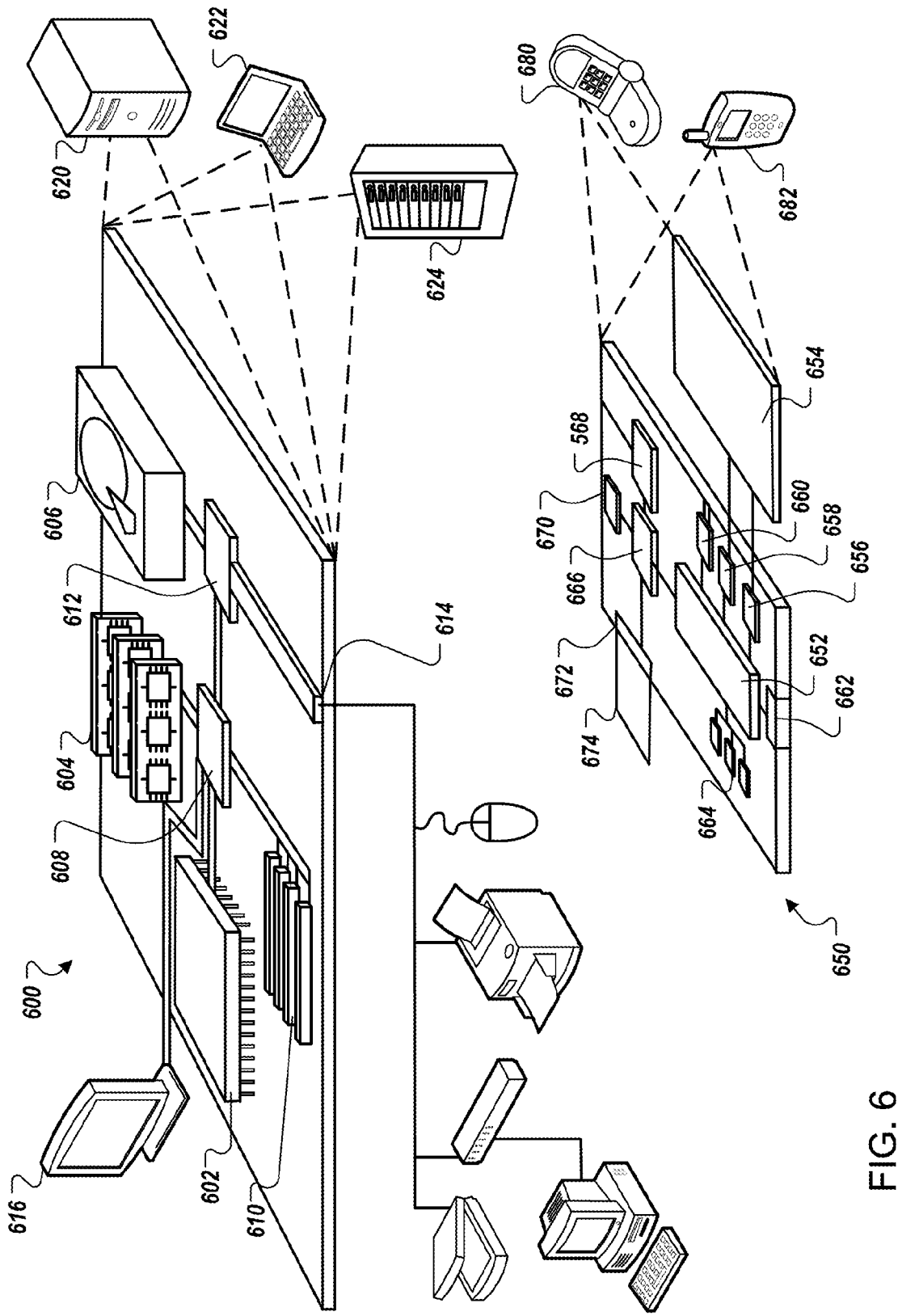
FIG. 6 shows examples of computing devices on which the processes described herein, or portions thereof, may be implemented.

FIG. 6 shows examples of computing devices on which the processes described herein, or portions thereof, may be implemented. In this regard, FIG. 6 shows an example of a generic computing device 600 and a generic mobile computing device 650, which may be used to implement the processes described herein, or portions thereof. For example, server(s) 304 may be implemented on computing device 600. Mobile computing device 650 may represent the mobile device 101 of FIG. 1.

Computing device 600 is intended to represent various forms of digital computers, examples of which include laptops, desktops, workstations, personal digital assistants, servers, blade servers, mainframes, and other appropriate computers. Computing device 650 is intended to represent various forms of mobile devices, examples of which include personal digital assistants, cellular telephones, smartphones, and other similar computing devices. The components shown here, their connections and relationships, and their functions, are meant to be exemplary only, and are not meant to limit implementations of the implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Components 602, 604, 606, 608, 610, and 612, are interconnected using various busses, and may be mounted on a common motherboard or in other manners as appropriate. The processor 602 may process instructions for execution within the computing device 600, including instructions stored in the memory 604 or on the storage device 606 to display graphical information for a GUI on an external input/output device, for example, display 616 coupled to high speed interface 608. In other implementations, multiple processors and/or multiple buses may be used, as appropriate, along with multiple memories and types of memory. Also, multiple computing devices 600 may be connected, with a device providing a portion of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, examples of which include a magnetic or optical disk.

The storage device 606 is capable of providing mass storage for the computing device 600. In one implementation, the storage device 606 may be or contain a computer-readable medium, examples of which include a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, including those described above. The information carrier may be a non-transitory computer- or machine-readable medium, for example, the memory 604, the storage device 606, or memory on processor 602. For example, the information carrier may be a non-transitory, machine-readable storage medium.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, e.g., a keyboard, a pointing device, a scanner, or a networking device, e.g., a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer, e.g., a laptop computer 622. Alternatively, components from computing device 600 may be combined with other components in a mobile device (not shown), e.g., device 650. Such devices may contain one or more of computing device 600, 650, and an entire system may be made up of multiple computing devices 600, 650 communicating with one other.

Computing device 650 includes a processor 652, memory 664, an input/output device, e.g., a display 654, a communication interface 666, and a transceiver 668, among other components. The device 650 may also be provided with a storage device, e.g., a microdrive or other device, to provide additional storage. The components 650, 652, 664, 654, 666, and 668, are interconnected using various buses, and several of the components may be mounted on a common motherboard or in other manners as appropriate.

The processor 652 may execute instructions within the computing device 650, including instructions stored in the memory 664. The processor may be implemented as a chipset of chips that include separate and multiple analog and digital processors. The processor may provide, for example, for coordination of the other components of the device 650, e.g., control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 may be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided by the SIMM cards, along with additional information, e.g., placing identifying information on the SIMM card in a non-hackable manner.

The memory may include, for example, flash memory and/ or NVRAM memory, as discussed below. In one implementation, a computer program product is tangibly embodied in an information carrier. The computer program product contains instructions that, when executed, perform one or more methods, including those described above. The information carrier is a computer- or machine-readable medium, e.g., the memory 664, expansion memory 674, memory on processor 652, and so forth that may be received, for example, over transceiver 668 or external interface 662.

Device 650 may communicate wirelessly through communication interface 666, which may include digital signal processing circuitry where necessary. Communication interface 666 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, e.g., using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, e.g., through a speaker, e.g., in a handset of device 650. Such sound may include sound from voice telephone calls, may include recorded sound (e.g., voice electronic messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be a form of sensory feedback (e.g., visual feedback, auditory feedback, or tactile feedback); and input from the user may be received in a form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or a combination of such back end, middleware, or front end components. The components of the system may be interconnected by a form or medium of digital data communication (e.g., a communication network). Examples of communication networks include a local area network ("LAN"), a wide area network ("WAN"), and the Internet.

The computing system may include clients and servers. A client and server are generally remote from one other and typically interact through a communication network. The relationship of client and server arises by virtue of computer programs running on the respective computers and having a client-server relationship to one other.

In some implementations, the engines described herein may be separated, combined or incorporated into a single or combined engine. The engines depicted in the figures are not intended to limit the systems described here to the software architectures shown in the figures.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Elements of different implementations described herein may be combined to form other implementations not specifically set forth above. Elements may be left out of the processes, computer programs, Web pages, etc., described herein without adversely affecting their operation. In addition, the logic flows depicted in the figures do not require the particular order shown, or sequential order, to achieve desirable results. Various separate elements may be combined into one or more individual elements to perform the functions described herein.

The features described herein may be combined in a single system, or used separately in one or more systems.

Other implementations not specifically described herein are also within the scope of the following claims.

What is claimed is:

1. A method performed by one or more processing devices, comprising:
    performing a preliminary recognition process on first audio, the preliminary recognition process comprising:
        identifying one or more candidates for the first audio;
        determining a plurality of path costs for the identified candidates, the plurality of path costs corresponding to sequences of sub-phonemes identified in the first audio;
        determining a best path cost for each of the identified candidates based on the plurality of path costs;
        associating the best path costs with the identified candidates; and
    providing the identified candidates and associated best path costs;
    generating first templates corresponding to the first audio, each first template comprising a number of elements corresponding to a sequence of sub-phonemes of the first audio;
    selecting second templates corresponding to the identified candidates, the second templates representing second audio, each second template comprising elements that correspond to the elements in the first templates;
    comparing the first templates to the second templates, wherein comparing comprises determining similarity metrics between the first templates and corresponding second templates, wherein the similarity metrics are based on
        exponentiated and scaled dynamic time warping (DTW) distances between the selected ones of the first templates and selected ones of the second templates;
    applying weights to the similarity metrics to produce weighted similarity metrics, the weights being associated with corresponding second templates;
    applying the weighted similarity metrics to corresponding best path costs to produce re-scored path costs, the re-scored path costs being associated with corresponding identified candidates; and
    using the re-scored path costs to determine which of the identified candidates corresponds to the first audio.

2. The method of claim 1, wherein selecting the second templates comprises selecting templates associated with a non-zero weight.

3. The method of claim 1, wherein metadata is associated with at least one of the first audio and the second audio, the metadata being used in obtaining at least the second templates.

4. The method of claim 3, wherein the metadata is indicative of the context of at least one of the first audio and the second audio.

5. The method of claim 4, wherein the metadata indicates at least one word that neighbors a word in at least one of the first audio and the second audio.

6. The method of claim 1, wherein the preliminary recognition process comprises a Hidden Markov Model (HMM) based process.

7. The method of claim 1, wherein applying the weighted similarity metrics to corresponding best path costs to produce re-scored path costs comprises using a conditional random field technique to generate a composite score indicative of an extent to which the first audio corresponds to the second audio.

8. The method of claim 1, wherein each element is at least one of: a phoneme in context, a syllable, or a word.

9. The method of claim 1, wherein, the first templates comprise vectors, the second templates comprise vectors, and the similarity metrics comprise distances between vectors.

10. The method of claim 1, wherein the second templates comprise multiple groups of second templates, each group of second templates representing a different version of a same candidate word or phrase for at least one of the first and second audio.

11. The method of claim 1, wherein second templates are selected from among a group of templates having associated weights, at least some of the weights being negative.

12. The method of claim 1, wherein the weights are determined using a conditional random field technique.

13. The method of claim 11, wherein at least some of the weights are zero, the zero weights being determined using a regularization technique.

14. The method of claim 1, wherein metadata is associated with at least one of the first audio and the second audio, the metadata indicating at least one of: information about a speaker of at least one of the first audio or the second audio, and information about an acoustic condition of at least one of the first audio or the second audio.

15. One or more non-transitory machine-readable media storing instructions that are executable to perform operations comprising:
   performing a preliminary recognition process on first audio, the preliminary recognition process comprising:
      identifying one or more candidates for the first audio;
      determining a plurality of path costs for the identified candidates, the plurality of path costs corresponding to sequences of sub-phonemes identified in the first audio;
      determining a best path cost for each of the identified candidates based on the plurality of path costs;
      associating the best path costs with the identified candidates; and
   providing the identified candidates and associated best path costs;
   generating first templates corresponding to the first audio, each first template comprising a number of elements corresponding to a sequence of sub-phonemes of the first audio;
   selecting second templates corresponding to the identified candidates, the second templates representing second audio, each second template comprising elements that correspond to the elements in the first templates;
   comparing the first templates to the second templates, wherein comparing comprises determining similarity metrics between the first templates and corresponding second templates, wherein the similarity metrics are based on
      exponentiated and scaled dynamic time warping (DTW) distances between the selected ones of the first templates and selected ones of the second templates;
   applying weights to the similarity metrics to produce weighted similarity metrics, the weights being associated with corresponding second templates; and
   applying the weighted similarity metrics to corresponding best path costs to produce re-scored bath costs, the re-scored bath costs being associated with corresponding identified candidates;
   using the re-scored path costs to determine which of the identified candidates corresponds to the first audio.

16. A system comprising:
   memory to store an acoustic model; and
   one or more processing devices to perform operations associated with the acoustic model, the acoustic model comprising:
   a first pass module to perform a preliminary recognition process on first audio, the preliminary recognition process comprising:
      identifying one or more candidates for the first audio;
      determining a plurality of path costs for the identified candidates, the plurality of path costs corresponding to sequences of sub-phonemes identified in the first audio;
      determining a best path cost for each of the identified candidates based on the plurality of path costs;
      associating the best path costs with the identified candidates; and
   providing the identified candidates and associated best path costs;
   a second pass module to:
      generate first templates corresponding to the first audio, each first template comprising a number of elements corresponding to a sequence of sub-phonemes of the first audio;
      select second templates corresponding to the identified candidates, the second templates representing second audio, each second template comprising elements that correspond to the elements in the first templates;
      compare the first templates to the second templates, wherein comparing comprises determining similarity metrics between the first templates and corresponding second templates, wherein the similarity metrics are based
         exponentiated and scaled dynamic time warping (DTW) distances between the selected ones of the first templates and selected ones of the second templates;
      apply weights to the similarity metrics to produce weighted similarity metrics, the weights being associated with corresponding second templates;
      apply the weighted similarity metrics to corresponding best path costs to produce re-scored path costs, the re-scored path costs being associated with corresponding identified candidates; and
      use the re-scored path costs to determine which of the identified candidates corresponds to the first audio.

* * * * *

UNITED STATES PATENT AND TRADEMARK OFFICE
CERTIFICATE OF CORRECTION

| | | |
|---|---|---|
| PATENT NO. | : 8,775,177 B1 | Page 1 of 1 |
| APPLICATION NO. | : 13/665245 | |
| DATED | : July 8, 2014 | |
| INVENTOR(S) | : Georg Heigold et al. | |

It is certified that error appears in the above-identified patent and that said Letters Patent is hereby corrected as shown below:

In the Claims

Column 20, line 5, Claim 15, please delete "bath" and insert therefor -- path --;

Column 20, line 6, Claim 15, please delete "bath" and insert therefor -- path --; and Column 20, line 42, Claim 16, after "based" please insert -- on --.

Signed and Sealed this
Twenty-first Day of October, 2014

Michelle K. Lee
*Deputy Director of the United States Patent and Trademark Office*